JOEL HAYDEN JR'S improvements in FAUCETS
No. 118012 — Patented Aug 15 1871
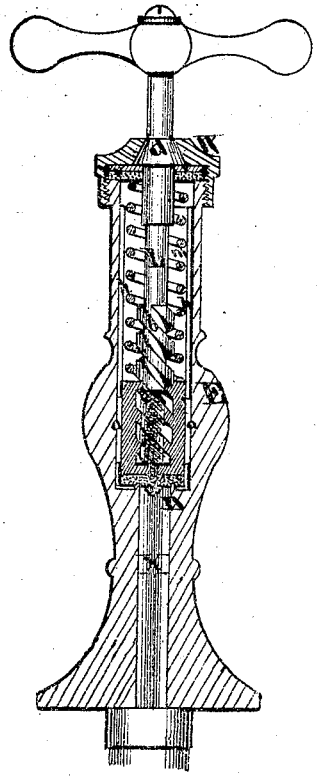
Fig. I.
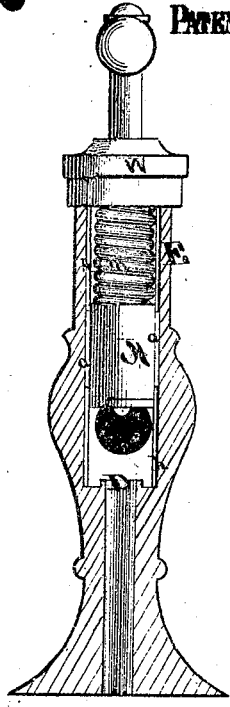
Fig. II.
Fig. III.
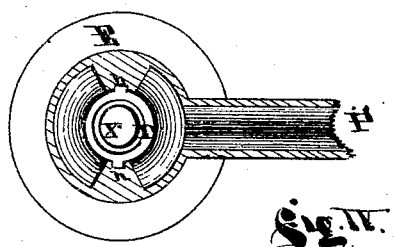
Fig. IV.
Witnesses:
Charles P. Drake
E. Dudley Chapin
Inventor:
Joel Hayden Jr
by his Attorneys
Gardiner & Hyde

118,012

UNITED STATES PATENT OFFICE.

JOEL HAYDEN, JR., OF HAYDENVILLE, MASSACHUSETTS.

IMPROVEMENT IN SELF-CLOSING FAUCETS.

Specification forming part of Letters Patent No. 118,012, dated August 15, 1871.

*To all whom it may concern:*

Be it known that I, JOEL HAYDEN, Jr., of Haydenville, Hampshire county, Commonwealth of Massachusetts, have invented certain Improvements in Faucets, of which the following is an exact specification:

My invention relates to that class of faucets in which the valve is raised from its seat against the pressure of a spring; and consists in a cylindrical valve provided upon its outside surface with two or more projections or wings fitting into corresponding depressions in the case of the faucet, (which depressions are for the purpose of guiding the valve in its rise and fall while preventing it from having any rotary motion,) in combination with a spindle having its end formed into a quick screw which is received into the valve itself, and prevented, by a conical shoulder upon its upper end and let into the cap, from any but a rotary movement. Between the washers, immediately beneath the cap constituting the packing and the upper face of the valve, is a coiled spring having one end resting upon each and surrounding the spindle, the compression of the spring tightening the packing against the inner face of the cap and around the rod and pressing the conical face of the stop within the cap. The grooves in which the valve works are prolonged within the swell of the faucet-case opposite the egress opening therein in stock left thick there for the purpose.

In the drawing, Figure I is a side sectional view; Fig. II, a partial side sectional view; Fig. III, an end view of the valve; and Fig. IV, a cross-sectional view through the egress-pipe.

A is the valve having the wings *a a*, and guided by the grooves *h h* in the case E of the faucet. L is the spindle having the quick thread *b* at one end and a short distance within the valve A when the latter is down upon its seat, so that the valve will commence to move instantly upon any revolution of the spindle. *d* is the conical stop upon the spindle fitting in the cap W, and V V rubber or other washers, constituting all the packing needed in a faucet of my improved construction. *m* is the coiled spring bearing upon the valve and packing. D is the valve-seat; X, the induction, and P the eduction-pipes.

Upon revolving the spindle by means of the handle surmounting it the valve is raised to the distance required, compressing the spring, which, when the hand is removed from the handle, immediately forces back the valve on the seat. The valve can have no grinding movement upon its seat to wear it, being held from such movement by its wings *a a*. The valve may be made to fit within the case sufficiently tight to preclude the entrance of the water to the space above it.

I am aware that the employment of coiled springs as the means of keeping a valve on its seat against the pressure of a head of water is not new; and, therefore, disclaim it, except as an element of my combination; as I also disclaim any peculiarity in the construction of the valve-seat, induction or egress-pipes, used in connection with my improvements; the principal advantage of the construction of my faucet being the capability of making a perfectly tight joint at the point where the stem enters the cap, as in all faucets in which the stem rises and falls it is necessary to renew the packing at intervals to compensate for the wear in the stem, allowing more or less leakage, while in mine the only wear upon the face of stop *d* is taken up by the spring below; but

What I claim is—

A self-closing faucet, in which are combined the case E having the grooves *h h*, the valve A with its wings *a a*, the spindle L provided with screw-thread *b* and stop *d*, and spring *m*, the parts being constructed and arranged substantially as and for the purpose set forth, and forming a faucet in which the stem has no rise or fall in operating the valve.

JOEL HAYDEN, JR.

Witnesses:
 B. S. JOHNSON,
 H. L. JAMES.